United States Patent
Strohrmann et al.

(10) Patent No.: US 7,373,816 B2
(45) Date of Patent: May 20, 2008

(54) PRINTED-CIRCUIT BOARD HAVING A PLASTIC PART FOR ACCOMMODATING A MEASURING DEVICE

(75) Inventors: Manfred Strohrmann, Karlsruhe (DE); Rainer Schard, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/574,059

(22) PCT Filed: Sep. 3, 2004

(86) PCT No.: PCT/EP2004/052038

§ 371 (c)(1),
(2), (4) Date: Jan. 9, 2007

(87) PCT Pub. No.: WO2005/031280

PCT Pub. Date: Apr. 7, 2005

(65) Prior Publication Data

US 2007/0107511 A1    May 17, 2007

(30) Foreign Application Priority Data

Sep. 29, 2003    (DE) ................................ 103 45 584

(51) Int. Cl.
*G01F 1/68*    (2006.01)
(52) U.S. Cl. .................................. 73/204.26
(58) Field of Classification Search ............ 73/204.26, 73/204.25, 204.23; 257/167, 467, 470, 414
See application file for complete search history.

(56) References Cited

U.S. PATENT DOCUMENTS 4,517,837 A    5/1985 Oyama et al.
5,396,795 A *  3/1995 Araki ....................... 73/204.26
5,744,713 A    4/1998 Wienand et al.
6,516,785 B1   2/2003 Nakada et al.
2002/0050165 A1  5/2002 Yonezawa et al.
2002/0064649 A1  5/2002 Lembke et al.
2002/0069699 A1  6/2002 Sato et al.

FOREIGN PATENT DOCUMENTS

WO    WO 02/08701    1/2002

OTHER PUBLICATIONS

Automotive Handbook 23rd [English version 5th], updated and expanded edition, Braunschweig, Wiesbaden, Viehweg, 1999, pp. 116-117.

* cited by examiner

*Primary Examiner*—Jewel Thompson
(74) *Attorney, Agent, or Firm*—Kenyon & Kenyon LLP

(57) ABSTRACT

The arrangement relates to a hot-film mass flow meter for recording the flow rate of a flowing medium in the intake tract or the charge air tract of an internal combustion engine. A substrate part is provided, that accommodates a sensor chip, which is allocated to a channel that has flowing through it at least one partial mass flow of the flowing medium. The sensor chip extends into channel that has flowing through it the partial mass flow of the flowing medium. The substrate part is formed either as a separately extruded plastic tongue or as a cavity extruded of plastic material. The sensor chip is integrated downstream with respect to a flow direction of the flowing medium, so as to lie behind a leading edge.

7 Claims, 5 Drawing Sheets

Fig. 5.1
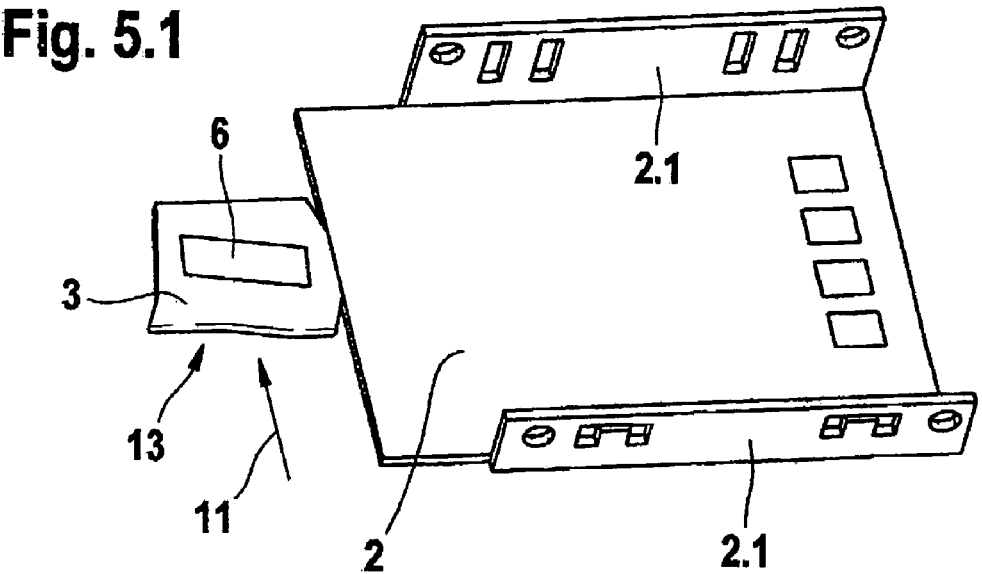
Fig. 5.2
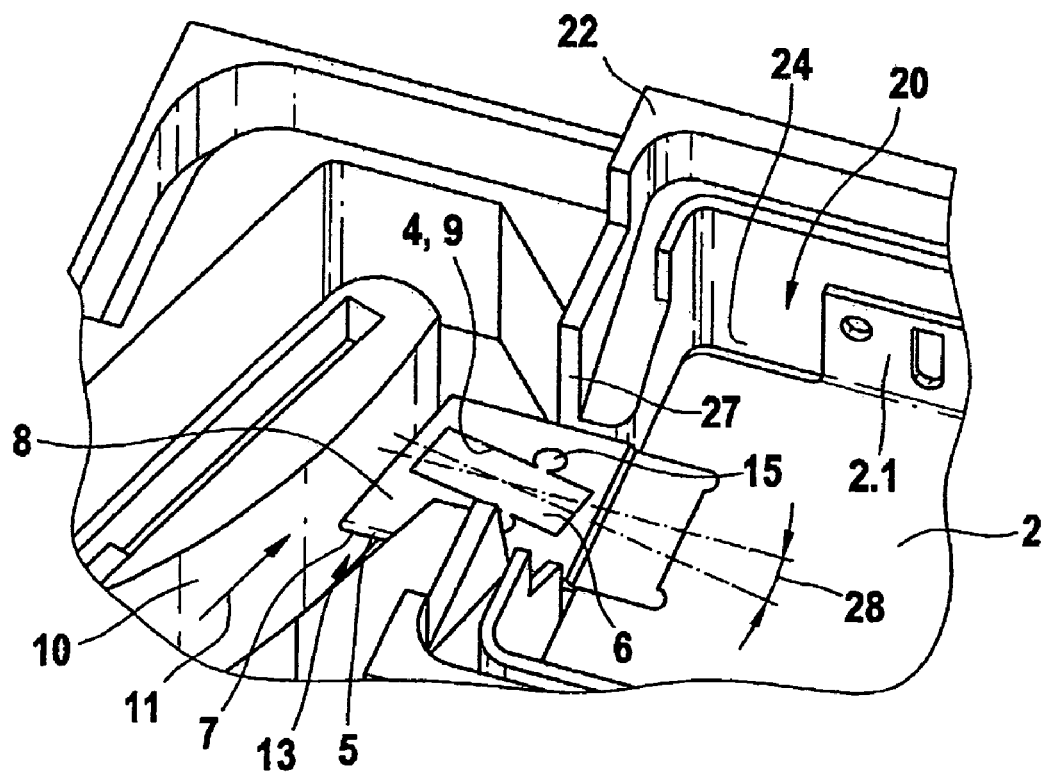

PRINTED-CIRCUIT BOARD HAVING A PLASTIC PART FOR ACCOMMODATING A MEASURING DEVICE

FIELD OF THE INVENTION

Flow rate meters are used to determine the rate of air flow in the intake tract or the charge tract of an internal combustion engine. Since the chemical process of combustion depends on the mass ratios, the mass flow rate of the intake/charge air has to be measured, for which, in part, volume-measuring or ram pressure measuring methods are also used. However, the maximum air mass flow that is to be measured, depending on the engine performance, is in the range between 400 to 1000 kg/h.

BACKGROUND INFORMATION

From Automotive Handbook 23rd, updated and expanded edition, Braunschweig, Wiesbaden, Viehweg, 1999, ISBN 3-528-03876-4, pp. 116 and 117, micromechanical hot-film air mass meters of the smallest dimensions are known, that work according to thermal principles. In these, heating and measuring resistors are sputtered, i.e. vapor-deposited, as thin Pt layers onto a silicon chip as carrier. The silicon chip is accommodated in the region of the heating resistor on a micromechanically thinned region of the carrier that is similar to a pressure sensor diaphragm, for the thermal decoupling from its mounting support. The heater resistor element is controlled to a constant overtemperature by the closely adjacently accommodated heating temperature sensor as well as by the air temperature sensor. The air temperature sensor is located inside a thickened edge region of the silicon chip. By contrast to other techniques, in the case of a micromechanical hot-film air mass meter, the heating current is not used as the output signal, but rather the temperature difference of the measured medium established by two temperature sensors, in the case of air mass meters of the air. One of the temperature sensors situated in front of the heating resistor element, as seen in the flow direction of the air, and one behind it. In contrast to the heating current, this output variable reflects the flow rate with its correct sign, even if also in a non-linear manner.

Micromechanical hot-film air mass meters, having detection of the flow direction in the case of a pulsating flow, have been designed for recording the load of internal combustion engines having gasoline and Diesel fuel injection. The installation into the air intake system is made, as a rule, between the air filter and a throttle device as a preassembled assembly having a plug sensor and a measuring housing. In the case of hot-film air mass sensors, thermal flow rate meters are involved. The sensor element and its temperature sensors and the heating region are mounted in a flow sheet metal structure. A partial air flow is conducted from the measuring tube past a sensor element through a measuring channel at the plug sensor housing. A two-part flow mesh made of plastic and stainless steel is provided downstream from the measuring channel. An allocation to the entire air mass flowing in the tube takes place via a calibration of the hot-film air mass meter.

It has turned out that the micromechanical hot-film air mass meters used up to now in continuous vehicle operations demonstrated clear characteristics curve drifts both when used in Otto engines and in Diesel engines. This originates from a flow under the sensor chip. If, because of manufacturing tolerances, the joint gap between the air flow sheet metal or mounting sheet metal is too big, a portion of the partial air mass flow flows at the back side of the sheet metal. The gap width of the joint gap is changed by soiling, so that the characteristics curve of the sensor chip changes because of soiling.

An additional reason for the characteristics curve drift is the corrosion of the air flow sheet metal. Corrosion products that form on the air flow sheet metal lead to a changed air flow to the sensor chip, and thus to a drift in its characteristics curve.

An additional cause of the characteristics curve drift is the running out of the sensor gel. The air flow sheet metal is made, as a rule, these days of a folded sheet metal. Because of the folding gap, sensor gel from an adjacent hybrid chamber reaches the vicinity of the sensor chip. By hybrid chamber is understood a circuit substrate on which the entire electronic system is accommodated. This hybrid chamber is filled with silicone gel so as to protect the integrated circuits and the appertaining bonding connections against environmental influences. The sensor gel acts a adhesive agent for dirt. Sensor gel that has exited from the hybrid chamber and dirt particles depositing on it lead to a change in the temperature housekeeping in the diaphragm of the sensor, and consequently lead to a drift of the sensor's characteristics curve.

SUMMARY OF THE INVENTION

Using the design approach provided, the underflowing of the sensor chip and the bleeding of sensor gel may be avoided, since, by the sensor accommodation provided by the present invention, a tight adhesion is made possible between the hybrid chamber and a bypass channel. Because of the use of modem plastics, one may achieve a tightening of tolerances that are customarily present these days. This, in turn, permits a more precise setting, i.e. a more accurate placing of the sensor chip into the already applied adhesive for the sensor element. This, in turn, results in a reduction in scrap in mass production. Furthermore, by using plastic in the production of the sensor accommodation, a controlled aerodynamic design may be implemented more easily.

In comparison to a sheet metal or a folded sheet metal, a plastic component has a substantially lower temperature swing. The temperature of the sheet metal tongue as compared to the temperature of a sheet metal, plotted against time, makes clear that the temperature of the sheet metal is slightly higher than that of the sheet metal tongue. For this reason, when the sensor chip is applied to the plastic, a thermal decoupling of the sensor chip is achieved from the air flow sheet metal that is submitted to great temperature changes.

The accommodation of the sensor chip is separated from the sheet metal base or the printed circuit board.

On the one hand, the plastic part, i.e. a plastic tongue for accommodating the sensor chip, may be extruded separately and subsequently may be clamped, adhered or welded to a printed circuit board, or fitted in a different manner.

On the other hand, the printed circuit board may be produced directly having a sheet metal plate in one process (heat sink technology). An SBU heat sink printed circuit board may be used as a substitute for a thick film. A printed circuit board manufactured according to heat sink technology, i.e. an SBU (sequential built up) printed circuit board, represents a printed circuit board developed in multilayer fashion. This may be used as a circuit substrate using a ceramic substrate. The SBU heat sink printed circuit board may be developed as a printed circuit board, patterned on both sides, having microvias and a chemically galvanized copper layer. Such SBU heat sink printed circuit boards are later clamped to the accommodation made of plastic for the sensor chip, or adhered, welded or fitted in a different manner. The last-named alternative stands out because of favorable production costs, since the printed circuit board patterning is produced directly connected to a metallic element for heat dissipation. Because of that, a separate sheet metal part may be omitted. In connection with a separately extruded plastic tongue as accommodation for the sensor chip, this represents a cost-effective construction concept; the printed circuit board is produced together with the metallic substrate, is patterned and subsequently outfitted with electronic component parts. The benefit is produced by cutting apart the overall substrate. A further increase in quality may be achieved by substituting a chip card extruded of plastic for the accommodation fastener for a sensor chip on a hot-film air mass meter. The use of plastic as the material for the production of the sensor layer offers numerous advantages over a sensor cavity stamped of sheet metal, since the plastic is easier to outline, and consequently more filigreed patterns are achievable. A precise accommodation of a sensor chip in a sensor cavity may be achieved by a possible tightening of the tolerances.

BRIEF DESCRIPTION OF THE DRAWINGS

FIG. 5.2 shows a representation reproduced on an enlarged scale of the plastic strap having an integrated sensor chip

DETAILED DESCRIPTION

Figure 1:
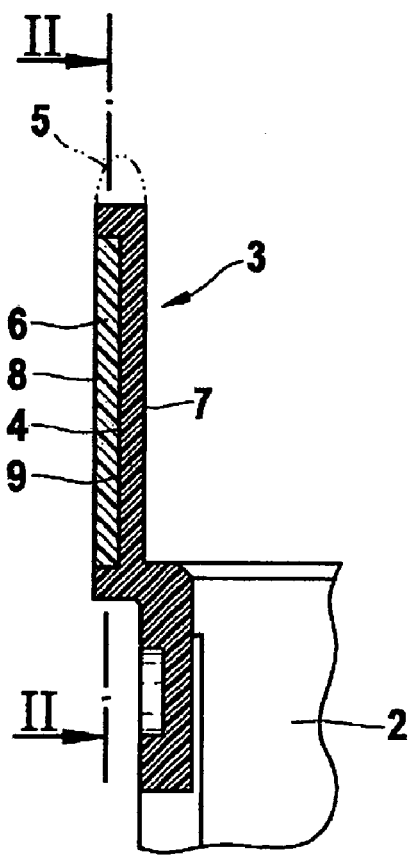
FIG. 1 shows a hot-film air mass meter in a considerably enlarged representation.

In FIG. 1 one may see, on a considerably enlarged scale, a plastic tongue for accommodating a sensor chip. Onto an electronic module 2, there is laterally extruded on a plastic substrate tongue 3. The plastic substrate tongue includes a recess 4 having a flat floor area, into which a sensor chip 6 may be inserted. Plastic substrate tongue 3, according to the illustration in FIG. 1, extends into a bypass channel, not shown in FIG. 1, which has a flowing medium flowing through it. The flowing medium sweeps over plastic substrate tongue 3 both on side 8, at which sensor chip 6 is accommodated and on back side 7. Recess 4, inside plastic substrate tongue 3, is constituted as cavity 9, and encloses sensor chip 6 on all sides. At plastic substrate tongue 3 an air flow edge 5 is formed which, according to the illustration in FIG. 1, may be formed as a round shape. Sensor chip 6, that is insertable into recess 4 that is constituted as a cavity 9, is preferably developed in a height that corresponds to the depth of recess 4 that is inserted into plastic substrate tongue 3, so that the flow of the flowing medium that passes air flow edge 5 of plastic substrate tongue 3 passes front side 8 of plastic substrate tongue 3 in a planar manner without having turbulences induced in the flow.

Figure 2:
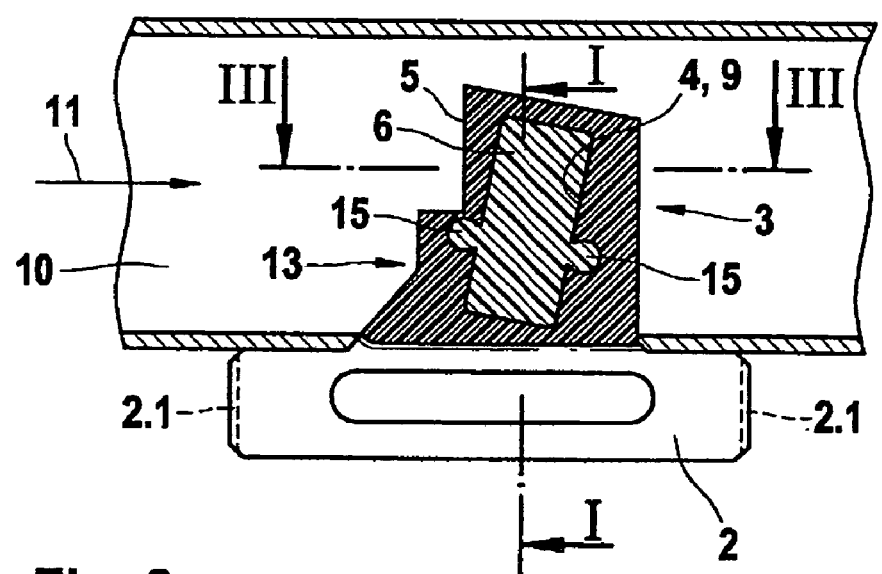
FIG. 2 shows a top view of the plastic tongue of a hot-film air mass meter according to the present invention.
Figure 3:
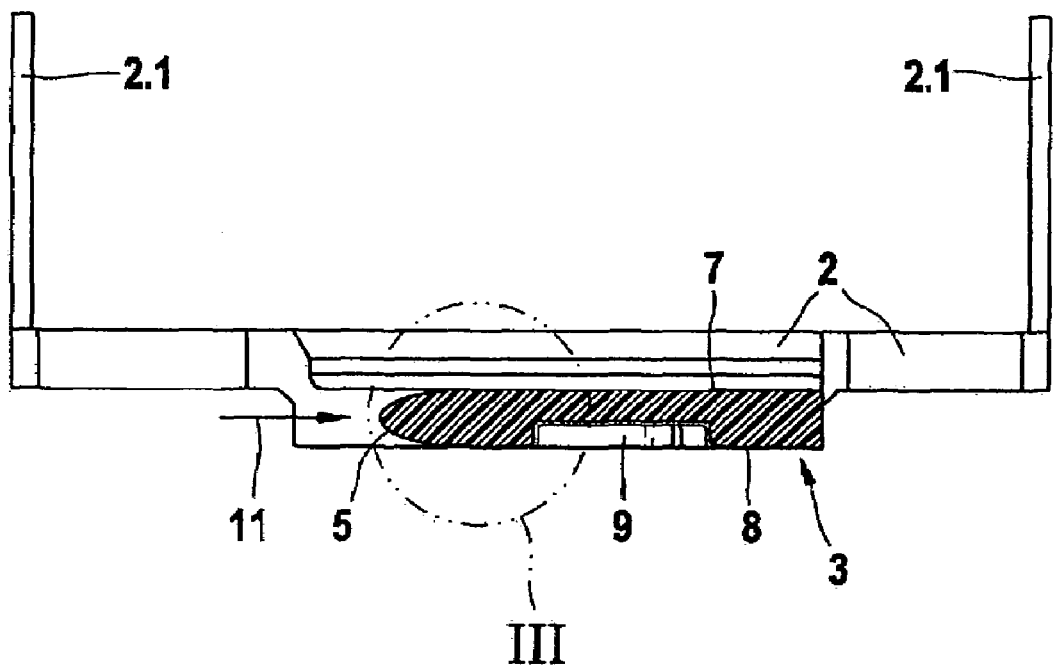
FIG. 3 shows a section as in III-III in FIG. 2 through a hot-film air mass meter.

In the representation according to FIG. 2 one may see a top view of the plastic substrate tongue shown in section in FIG. 1. Plastic substrate tongue 3 is fixed using fastening pins in a unit housing constituted as an electronic module 2 in such a way that plastic substrate tongue 3 extends into a bypass channel 10, as indicated schematically in FIG. 2. A flow passing through bypass channel 10 in air flow direction 11 flows against air flow edge 5, of plastic substrate tongue 3, that is developed in aerodynamic contour 13. Sensor chip 6 is fastened, for example, by adhesion in recess 4 designed as cavity 9 of plastic substrate tongue 3. In the unit housing developed as electronic module 2, an opening may be provided for the improved accommodation of a printed circuit board, into which an adhesive substance is applied, in order firmly to install a printed circuit board on electronic module 2. FIG. 3 shows a representation of the plastic substrate tongue according to section pattern III-III in FIG. 2.

Plastic substrate tongue 3, according to the representation in FIG. 3 is shown partially in section. Sensor chip 6 is inserted into recess 4 of plastic substrate tongue 3, that is developed as cavity 9.

Sensor chip 6 is inserted into the recess of plastic substrate tongue 3, that is developed as cavity 9. Adhesion tabs 15 are developed at the sides of sensor chip 6, and these engage with recesses in plastic substrate tongue 3 corresponding to them. At the bottom area of recess 4 in plastic substrate tongue 3 that is developed as cavity 9, an adhesive layer is applied so as to connect sensor chip 6 to plastic substrate tongue 3. Side crosspieces 2.1 are developed on electronic module 2 (sheet metal part).

Figure 4:
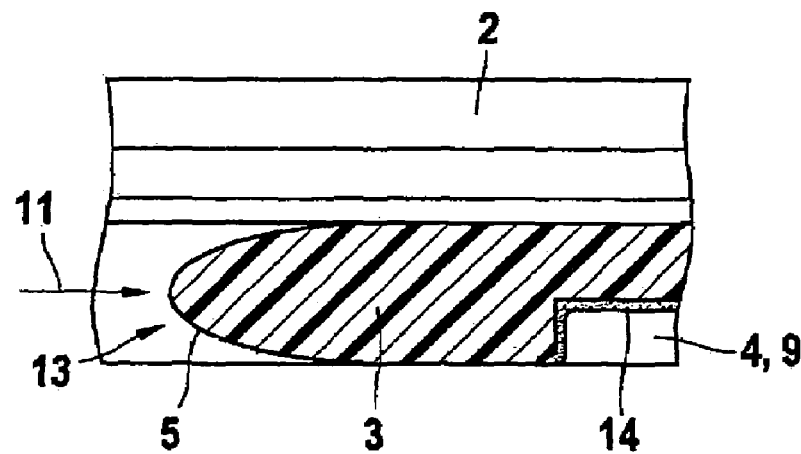
FIG. 4 shows a detail of the air flow edge of a plastic strap in which a sensor chip is accommodated.

The flow of a gaseous medium, flowing through a bypass channel not shown in FIG. 3, flows against the leading edge of plastic substrate tongue 3 in flow direction 11. The section designated by a circle in FIG. 3 is reproduced in the illustration as in FIG. 4 at an enlarged scale. It may be seen from the illustration according to FIG. 4 that leading edge 5 is constituted as an aerodynamic contour 13. Leading edge 5 may be developed to be rounded, frustum-shaped, or even to have an approximately elliptical contour. As seen in air flow direction 11, a cavity-shaped recess 4 is developed in plastic substrate tongue 3. An adhesive layer 14 is applied, in cavity-shaped constituted recess 4, using which the sensor chip, not shown in FIG. 4, is inserted into cavity 9. The thickness of adhesive layer 14 is dimensioned so that sensor chip 6 adhered in cavity 9 does not protrude beyond the lower edge of plastic substrate tongue 3, that is, the flow of the gaseous medium may pass plastic substrate tongue 3 approximately free of turbulence.

Figure 5:
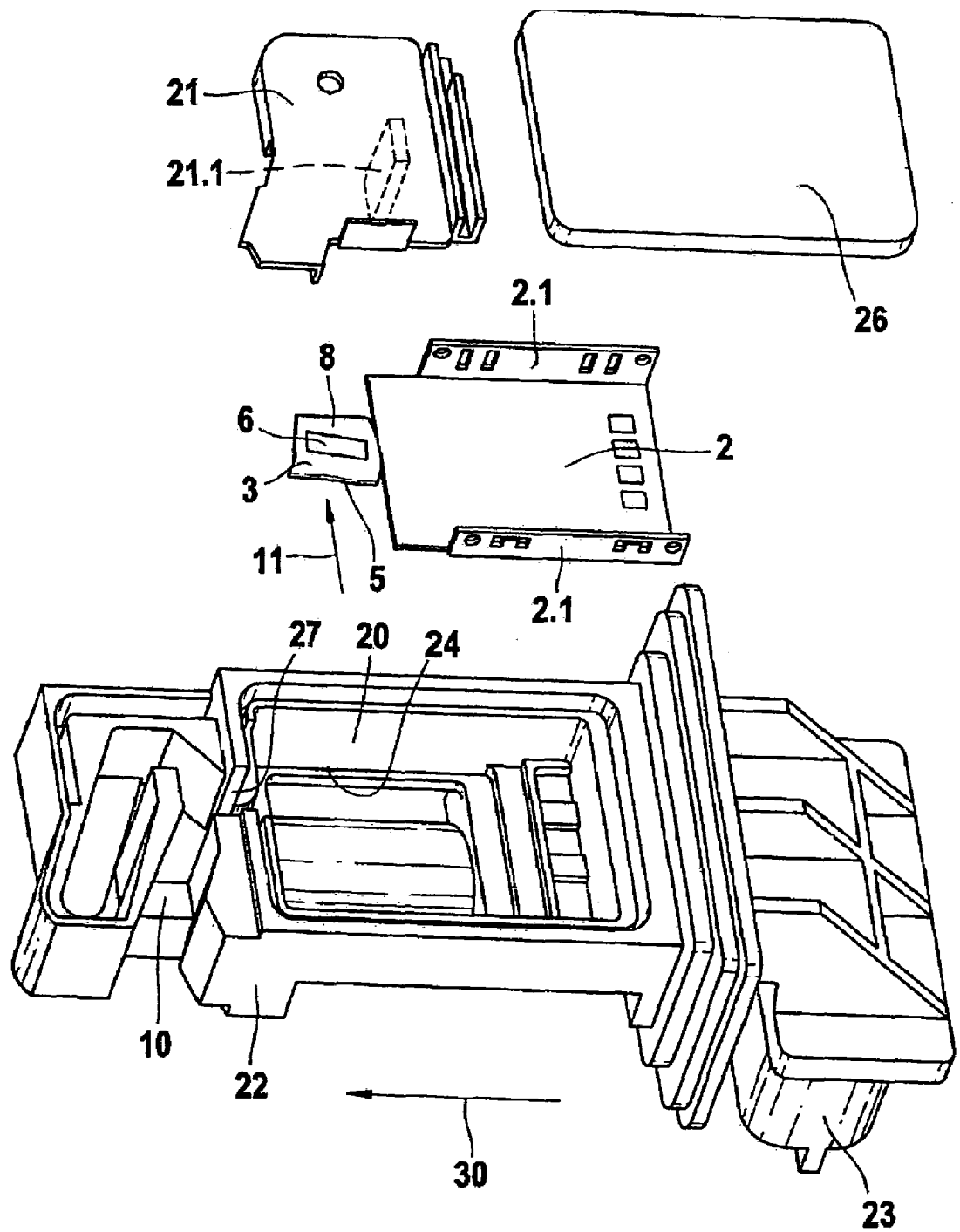
FIG. 5 shows a sensor chip accommodation housing having a tangent-bent plug, a printed circuit board having an extruded-on plastic strap, a hybrid chamber cover and a sensor accommodation lid FIG. 5.1 shows an enlarged representation of a printed circuit board having a sensor chip inserted into a plastic tongue.

FIG. 5 shows the components of a hot-film air mass meter, a plug housing, an electronics module, a hybrid chamber and a cavity cover.

Figure 6:
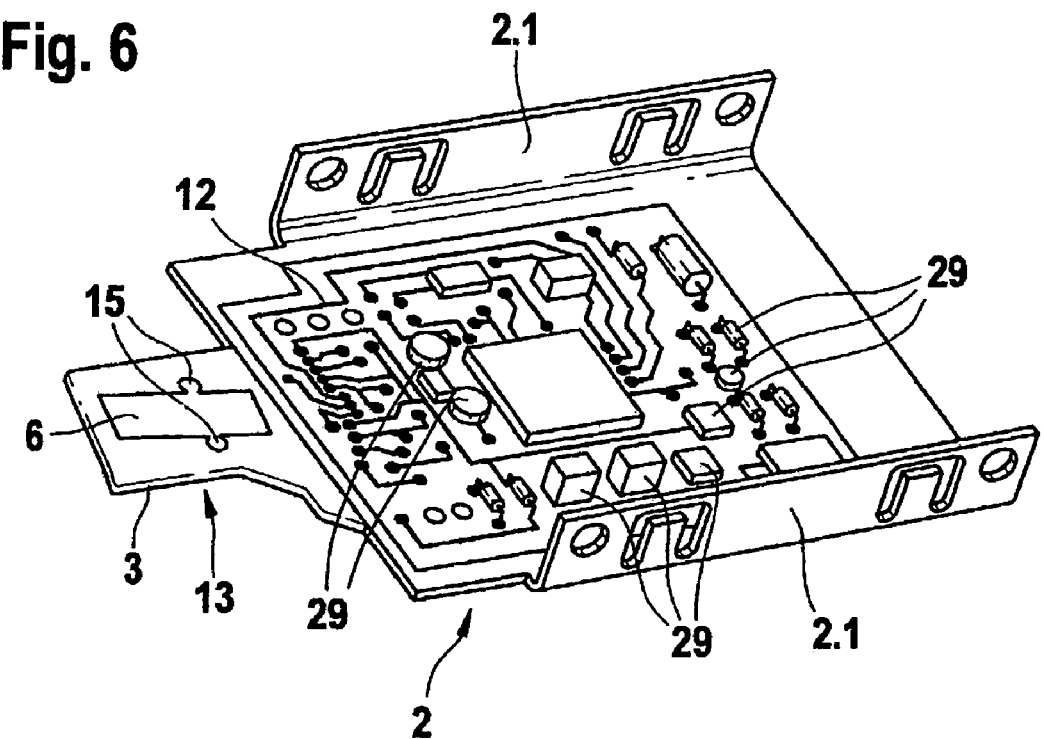
FIG. 6 shows a printed circuit board fitted with electronic components.

On a housing 22 that is preferably made as a plastic extrusion component, a plug 23 is developed that is situated in a bent manner in the illustration according to FIG. 6. For latching to a flow pipe, plug housing 22 has a plane that is developed to be graded. In plug housing 22 a support surface 24 is developed into which electronics module 2 is able to be inserted. Furthermore, bypass channel 10 is developed in plug housing 10 which is separated by a wall from a hybrid chamber 20. In a wall bordering hybrid chamber 20, an opening 27 is provided that is penetrated by plastic substrate tongue 3. When a hybrid chamber/bypass channel cover 21 is placed on it, this opening 27 is closed by a tongue 21.1 developed on it. On its side pointing towards plastic substrate tongue 3, tongue 21.1 may be provided with adhesive, so that tight adhesion between bypass channel 10 and hybrid chamber 20 of plug housing 22 is achieved.

In plug housing 22 a support surface 24 is developed into which electronics module 2 is inserted. Side crosspieces 2.1 of electronics module 2 are adjacent to the walls of support surface 24. In one wall of plug housing 22, which surrounds electronics module 2, an opening 27 is provided. Plastic substrate tongue 3, in which sensor chip 6 is inserted, extends through opening 27. The flowing medium flows through bypass channel 10 in control direction 11, so that the flowing medium sweeps over both front side 8 and back side 9 of plastic substrate tongue 3.

Plug housing 22, on whose support surface 24 electronics module 2 is inserted, includes a plug connector 23 that is developed in an optionally bent manner. Plug connector 23 is in contact with electronics module 2 via contacts that are not shown in greater detail.

The electronics module becomes clearer from the illustration according to FIG. 5.1.

Plastic substrate tongue 3, into which sensor chip 6 is inserted, is developed at the side of electronics module 2 pointing towards bypass channel 10. The angle of orientation, at which sensor chip 6 is situated relative to plastic substrate tongue 3, corresponds to the angle at which bypass channel 10 runs inside plug housing 22. Sensor chip 6 is inserted into plastic substrate tongue 3 in such a way that the latter is situated orthogonally to air flow direction 11 in bypass channel 10.

There are contact pads at the opposite end from plastic substrate tongue 3 on the floor plate of electronics module 2, to which the contacts of plug 23 are connected. For the sake of completeness, it should be mentioned that a ready mounted plug housing 22, having an electronics module 2 having integrally mounted hybrid chamber/bypass channel cover 21 and mounted cavity cover 26, is able to be integrated into a flow pipe 31 in the direction of mounting arrow 30. Flow pipe 31 may be seen in FIG. 8.

In an enlarged view, FIG. 5.2 shows a breakthrough location in the plug housing and the plastic substrate tongue extending into the bypass channel.

Side crosspieces 2.1 of electronics module 2 are adjacent to the walls of plug housing 22 which enclose support surface 24 for electronics module 2. Plastic tongue 3, that may be directly extruded onto the floor plate of electronics module 2, or may be fastened to it as a separate component, extends into bypass channel 10 of the plug housing. Bypass channel 10 is separated from hybrid chamber 20 by a wall that is developed in plug housing 22.

The angle at which sensor chip 6 is oriented at front side 8 of plastic substrate tongue 3 is characterized by reference numeral 28, and it corresponds to the angle of inclination at which bypass channel 10 runs in plug housing 22. Sensor chip 3 is fixed in plastic substrate tongue 3 using adhesion tabs 15. Opening 27 in plug housing 22 is dimensioned so that plastic substrate tongue 3 completely takes up its dimension in width. The gaseous medium flowing into bypass channel 10 flows against leading edge 5 of plastic substrate tongue 3 that is developed in an aerodynamic contour 13.

From FIG. 6 a printed circuit board may be seen that is fastened to the floor plate of the electronics module.

Printed circuit board 12 that is provided with electronics components 29 as well as printed circuit traces may be adhesively fastened to the floor plate of electronics module 2 or fastened in another way, such as by pinning. The pinning of printed circuit board 12 to the floor plate of electronics module 2 may be done by latchable pins, using which printed circuit board 12 is connected at its corner points to the floor plate of electronics module 2 that is developed as a metallic U profile.

Plastic substrate tongue 3, shown in FIG. 6, which is used to accommodate sensor chip 6, may either be extruded separately and subsequently clamped, adhered or welded to printed circuit board 12.

On the other hand, printed circuit board 12 may be produced directly having a sheet metal plate in one process (heat sink technology (SBU)). A printed circuit board produced according to the SBU heat sink method includes an SBU heat sink printed circuit board patterned on both sides, having microvias and a chemically galvanic copper layer. This heat sink printed circuit board is later clamped to plastic substrate tongue 3 for the accommodation of sensor chip 6 or fastened adhesively or integrally connected according to another bonding method. The development of printed circuit board 12 in heat sink technology is first of all substantially more cost-effective than using a hybrid, since the printed circuit plate structure may be produced connected to a heat-dissipating metal. In connection with a separately extruded plastic substrate tongue 3 for accommodating sensor chip 6, this represents a very cost-effective electronic construction concept. The sheet metal plate is first stamped; then the parts are layered on a pressure compensation carrier 16 and press-fit to one another. Printed circuit board 12 may be patterned using a standard process. Thereafter, plastic substrate tongue 3 may be mounted directly onto printed circuit board 12.

Alternatively, it is possible to produce plastic substrate tongue 3 directly along with an accommodation 4 used as cavity 9. The use of plastic as the material for producing the plastic substrate tongue has numerous advantages compared to a sensor cavity formed from sheet metal. First of all, the plastic is much easier to pattern, and consequently to produce more filigreed shapes. The tightening of manufacturing tolerances made possible thereby makes possible a more precise mounting of the sensor chip into recess 4 of plastic substrate tongue 3, that is functioning as cavity 9.

Because of the many optional forming possibilities of plastics, aerodynamic requirements with respect to developing leading edge 5 of the plastic substrate tongue may be implemented which, up until now, could not be taken into consideration for reasons of construction and manufacturing technology. A floor sheet metal used up to now, which had to be produced in an additional, costly galvanic way, and was installed by applying a NiNiP layer as corrosion protection, may be omitted in the future. Sensor chip 6 may be rotated orthogonally to air flow direction 11, so that a second diagonal bracing adhesion in the rear region of bypass channel 10 may be omitted. After the plastic extrusion, the finished part may be packed directly in transportation foil; one may then do without treatment as bulk material and damage related to that, as well as bending of the plastic substrate tongue affecting its characteristics curve.

A flat plastic layer is used as support surface for sensor chip 6, that is, as the floor of recess 4 acting as cavity 9. Adhesion pads 15, applied at the sides of sensor chip 6, make possible a completely tight adhesion in the area between bypass channel 11 and the electronics chamber. Between the lower side of tongue 21.1 and the upper side of the plastic substrate tongue, in which sensor chip 6 is inserted, an adhesive layer is applied so that bypass channel 10 and hybrid chamber 20 are sealed from each other.

The accommodation of sensor chip 6 inside a recess 4 of plastic substrate tongue 3 functioning as a cavity 9, according to the present invention, has the effect that no gel gets onto sensor chip 6, and consequently the functioning tolerance for the service life is able to be improved. Furthermore, by avoiding flow under sensor chip 6 by a seal on the flow-in side (direct influencing of the lower side of the diaphragm or boundary layer evacuation effect), characteristic curve scattering is clearly reduced. A sensor chip 6 not having flowing media flowing under it is insensitive to its position inside recess 4 that is used as cavity 9, and demonstrates a lower drift over its service life. The development of leading edge 5 in an aerodynamically favorable contour 13 may be varied corresponding to use requirements and may be purposefully, aerodynamically adapted.

Figure 7:
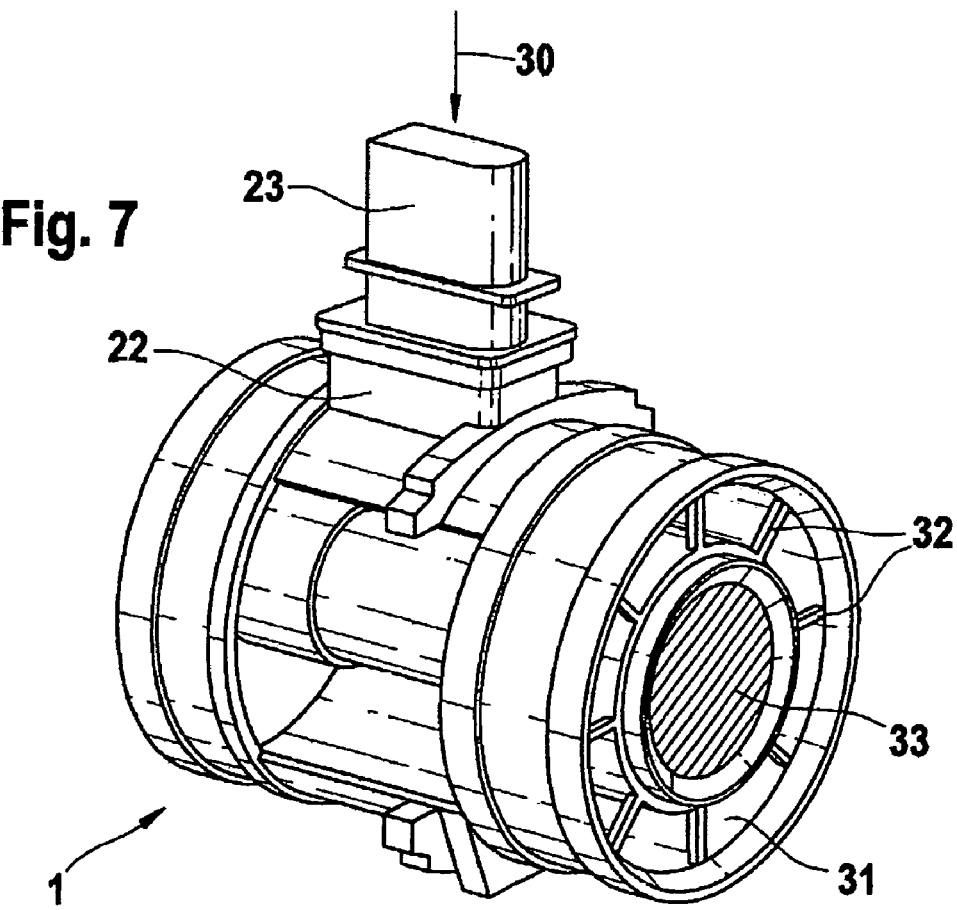
FIG. 7 shows an overall representation of a hot-film air mass sensor.

In FIG. 7 one may see in greater detail a hot-film air mass meter 1, which is integrated into a flow pipe 31 in the mounting direction 30. For this, plug housing 22 having plug 23 is pushed in all the way into flow pipe 31. In flow pipe 31, items are built in, such as straightener 32 that straightens the flowing medium and an approximately centrally situated deflector grating 33.

LIST OF REFERENCE NUMERALS 1 hot-film air mass meter
2 electronics module
2.1 side crosspiece
3 plastic substrate tongue
4 recess
5 leading edge
6 sensor chip
7 lower side
8 upper side
9 cavity
10 bypass channel
11 air flow direction
12 printed circuit board
13 aerodynamic contour
14 adhesive layer
15 adhesion tab
16 pressure compensating carrier
17 first packing thickness
18 second packing thickness
19 sensor accommodation
20 hybrid chamber
21 hybrid chamber cover
22 housing
23 plug
24 supporting surface
25 diagonal bracing adhesion
26 cavity cover
27 opening
28 installation angle
29 electronics components
30 mounting direction
31 flow pipe
32 straightener
33 deflector grating

What is claimed is:

1. A hot-film air mass meter for recording an air flow rate in one of an intake air tract and a charge air tract of an internal combustion engine, comprising:
   a sensor chip; and
   a substrate part that accommodates the sensor chip allocated to a channel that has flowing therethrough at least a partial mass flow of a flowing medium, the sensor chip extending into the channel, wherein:
      the substrate part, into which the sensor chip is integrated downstream with respect to a flow direction and lying behind a leading edge, corresponds to one of a component that is able to be fastened separately to an electronics module and a unit extruded onto the electronics module; and
      the sensor chip is accommodated in a recess used to limit the sensor chip on all sides as a cavity at a circumflowed side of the substrate part.

2. The hot-film air mass meter as recited in claim 1, wherein an upper side of the sensor chip forms a flat running surface with a side of the substrate part.

3. The hot-film air mass meter as recited in claim 1, wherein a tight adhesion is formed between a hybrid chamber and the channel.

4. The hot-film air mass meter as recited in claim 1, wherein a floor of the recess used as the cavity in the substrate part is flat.

5. The hot-film air mass meter as recited in claim 1, wherein the electronics module lies on a support surface of a plug housing that has an opening pointing towards the channel.

6. The hot-film air mass meter as recited in claim 1, further comprising:
   a printed circuit board accommodated in the electronics module and being developed in a U profile by one of being set with pins and adhered.

7. The hot-film air mass meter as recited in claim 1, wherein the sensor chip is fixed within the recess by latching projections.

* * * * *